(12) United States Patent
Alsewailem et al.

(10) Patent No.: US 9,783,657 B2
(45) Date of Patent: Oct. 10, 2017

(54) RENEWABLE AND COST-EFFECTIVE FILLERS FOR POLYMERIC MATERIALS

(71) Applicant: King Abdulaziz City for Science and Technology, Riyadh (SA)

(72) Inventors: Fares D. Alsewailem, Riyadh (SA); Yazeed A. Binkheder, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 906 days.

(21) Appl. No.: 13/784,055

(22) Filed: Mar. 4, 2013

(65) Prior Publication Data
US 2013/0178562 A1    Jul. 11, 2013

Related U.S. Application Data

(62) Division of application No. 13/275,977, filed on Oct. 18, 2011.

(51) Int. Cl.
C08K 11/00 (2006.01)
C08J 5/04 (2006.01)
C08L 23/06 (2006.01)
C08L 25/06 (2006.01)
C08L 27/06 (2006.01)
(Continued)

(52) U.S. Cl.
CPC ............ C08K 11/00 (2013.01); C08J 5/045 (2013.01); C08K 5/0008 (2013.01); C08L 23/06 (2013.01); C08L 25/06 (2013.01); C08L 27/06 (2013.01); C08L 77/00 (2013.01); C08L 99/00 (2013.01); C08J 2323/06 (2013.01); C08J 2325/06 (2013.01); C08L 2205/14 (2013.01)

(58) Field of Classification Search
USPC .......................................................... 524/15
See application file for complete search history.

(56) References Cited

U.S. PATENT DOCUMENTS 2,733,138 A * 1/1956 Clark .............................. 51/303
3,539,478 A * 11/1970 McDow et al. ................. 524/15
(Continued)

FOREIGN PATENT DOCUMENTS

EP    292628 A2 * 11/1988
GB    503180 A1    4/1939
JP    2005206954 A    8/2005

OTHER PUBLICATIONS

Alsewailem, F., et al., "Preparation and characterization of polymer/date pits composites," J. Reinf. Plast. Comp., published online Jun. 23, 2009.*

(Continued)

Primary Examiner — Mark Eashoo
Assistant Examiner — Nicholas Hill
(74) Attorney, Agent, or Firm — Andrew M. Calderon; Roberts, Mlotkowski Safran Cole & Calderon, P.C.

(57) ABSTRACT

Polymer composites are provided, and more particularly, polymer composites of ground date pits disposed in a polymer matrix. The composites can be formed by a process of preparing reinforced polymer composites having a fibril melt fracture surface, including blending a mixture of date pit particulate with a thermoplastic polymer; melting the mixture; and forcing the melt through a die to produce the polymer composite having a fibril containing surface.

7 Claims, 3 Drawing Sheets

(51) Int. Cl.
*C08L 77/00* (2006.01)
*C08K 5/00* (2006.01)
*C08L 99/00* (2006.01)

(56) References Cited

U.S. PATENT DOCUMENTS

| | | | |
|---|---|---|---|
| 3,927,235 A * | 12/1975 | Chow | 428/292.4 |
| 4,011,130 A | 3/1977 | Worden | |
| 5,346,930 A * | 9/1994 | Maine et al. | 523/164 |
| 5,951,927 A * | 9/1999 | Cope | 264/54 |
| 6,383,053 B1 | 5/2002 | Segers | |
| 7,647,964 B2 | 1/2010 | Akbar et al. | |
| 7,727,940 B2 | 6/2010 | Reddy et al. | |
| 7,931,087 B2 | 4/2011 | Gupta | |
| 2005/0194137 A1* | 9/2005 | Nguyen et al. | 166/276 |
| 2006/0033229 A1* | 2/2006 | Daley | 264/109 |
| 2007/0209794 A1* | 9/2007 | Kaufman et al. | 166/276 |
| 2010/0160505 A1 | 6/2010 | Kumazawa et al. | |

OTHER PUBLICATIONS

Stark, N., "Effect of Species and Particle Size on Properties of Wood-Flour-Filled Polypropylene Composites," Functional Fillers, Intertech Conferences, Nov. 1997, pp. 1-22.*

F.D. Alsewailem et al., "Preparation and Characterization of Polymer/Date Pits Composites", Journal of Reinforced Plastics and Composites, pp. 1743-1749, vol. 29, No. 11/2010.

A. Ghazanfari et al.,"Thermal and Mechanical Properties of Blends and Composites from HDPE and Date Pits Particles", Journal of Composite Materials, pp. 77-89, 2008, 42: 77.

W. Al-Shahib et al., "The fruit of the date palm . . . the future?", International Journal of Food Sciences and Nutrition, pp. 247-259, vol. 54, Jul. 2003.

Gregorova, a., et al., "Poly(lactide acid) Composites Reinforced . . . From Different Tissue Types of Picea Sitchensis," J. Applied Polymer Sciences, 2009, 114, pp. 2616-2623.

Van de Velde, K., et al., "Thermoplastic Pultrusion of Natural Fibre Reinforced Composites," Composite Structure, 2001, pp. 355-360.

Office Action for related application no. 13/784,067 dated May 9, 2013.

Final Office Action for related application no. 13/275,977 dated Jun. 6, 2013.

Wolf, R., et al., "Plastics, Additives," Ullmann's Encyclopedia of Industrial Chemistry, vol. 27, Jun. 2000, pp. 619-671.

Unknown, "Particle Size - US Sieve Series and Tyler Mesh Size Equivalents. Conversion Table.", Nov. 27, 2006, pp. 1-2.

Final Office Action for related U.S. Appl. No. 13/784,067 dated Sep. 24, 2013.

Advisory Action for related U.S. Appl. No. 13/275,977 dated Aug. 15, 2013.

Notice of Allowance for related U.S. Appl. No. 13/784,067 dated Dec. 24, 2013, 9 pages.

Office Action for related U.S. Appl. No. 13/275,977 dated Sep. 19, 2016, 11 pages.

Oksman, Kristiina, and Craig Clemons. "Mechanical properties polypropylene-wood. " Journal of applied polymer science 67 (1998): 1503-1513.

* cited by examiner

RENEWABLE AND COST-EFFECTIVE FILLERS FOR POLYMERIC MATERIALS

CROSS REFERENCE TO RELATED APPLICATIONS

This application is a divisional application of U.S. application Ser. No. 13/275,977, filed on Oct. 18, 2011, the contents of which are incorporated by reference in their entirety herein.

FIELD OF THE INVENTION

The invention relates to a polymer composite, and more particularly, to a polymer composite of ground date pits disposed in a polymer matrix.

BACKGROUND OF THE INVENTION

Fillers are routinely used by polymer and plastic industry to reduce the cost of end products and to enhance some desired properties, such as physical and mechanical properties. However, conventional filler materials can be costly and therefore need to be processed in an efficient manner, and conventional inorganic fillers, such as aluminium trihydroxide and the like may pose environment risks when used as polymer fillers.

Formulation of biocomposites has been an attractive endeavor for researchers in the last decade. There are several advantages, either environmental or economical, of using biocomposites over ordinary composites, especially those based on thermoplastics matrices, for various applications such as structural and food packaging. The biodegradability feature of such composites offers a solution for the problem of municipal waste management. Besides the biodegradability of polymers filled with biomaterials, the availability of these fillers, normally of agricultural residue origin, at very low cost levels makes the production of these composites economically feasible.

Several biocomposite systems of thermoplastic matrices and bio-fillers have been reported in the literature, wherein various bio-fillers, such as wheat straw, corncob, rice husk, and sugarcane bagasse were incorporated with polymer matrices, such as polypropylene, high-density polyethylene (HDPE), low-density polyethylene, and polyvinyl chloride. From an economic point of view, incorporating a cost-effective filler in a polymer will only be feasible if it does not drastically alter the main matrix-resin characteristics, such as mechanical properties.

Saudi Arabia is well recognized for its palm trees (*Phoenix dactylifera* L.). In addition, Saudi Arabia is among the largest world producers of date fruit, 4700,000 MT per year. On the consumption of date fruit as a main daily meal in almost each Saudi dwelling, date pits are usually discarded as materials with no use or value. Nevertheless, these presumably designated waste materials, i.e., date pits, contain important constituents such as oils (up to 10%), minerals (considerably rich in potassium), and fibers (46.4%) that may be utilized for specific purposes.

Ghazanfari et al. ("Thermal and Mechanical Properties of Blends and Composites from HDPE and Date Pits Particles", *Journal of Composite Materials*, 42(1) (2008); pp. 77-89) disclose formulating polymer-date pits composites based on HDPE as the hosting polymer, and conclude that incorporating date pit flour with HDPE tends to decrease the melt flow index (MFI), and at the same time increase the thermal conductivity of the resulting composites. The date pits investigated by Ghazanfari et al. are of the Abdoulahi cultivar, which demonstrate reductions in tensile strength as compared to non-composited (neat) polymer, on increasing weight percentages of date pit flour in the composites.

U.S. Pat. No. 4,011,130 to Worden discloses waterlaid sheets comprising essential solids consisting of (I) elastomeric (polyurethane) binder, and (II) nonelastomeric solids comprising inflexible, non-fibrous, rounded, particulate fillers (which may be vegetable flours prepared from peach pits, apricot pits and cherry pits) and a fibrous reinforcing component. The waterlaid sheets are useful as substitutes for leather in the manufacture of footwear, particularly as the outsole or insole portion of a shoe. However, no comparison of tensile strength between the neat polymer and the polymer composite is provided.

Accordingly, polymer and plastic industries would benefit from a demonstration of affordable, efficient bio-fillers which would reduce the cost of the final products and yet not diminish the strength characteristics of the polymer, as compared to the corresponding non-composited polymer.

SUMMARY OF THE INVENTION

In a first aspect of the invention, a process of preparing a reinforced polymer composite having a fibril melt fracture surface, comprises blending a mixture of date pit particulate with a thermoplastic polymer; melting the mixture; and forcing the melt through a die to produce the polymer composite having a fibril containing surface.

In another aspect the invention, composition comprises a mixture of date pit particulate from the fruit of *Phoenix dactylifera* L., variety khlaas or sekari, and a thermosetting polymer selected from the group consisting of epoxies, vinyl esters and polyesters.

In yet another aspect of the invention, a process of preparing a reinforced polymer composite, comprises solution blending a mixture of date pit particulate from the fruit of *Phoenix dactylifera* L., variety khlaas or sekari, and a solution of a thermosetting polymer, and removing solvent from the solution.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1A:
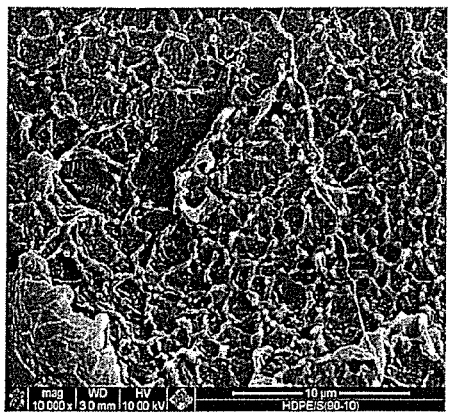
FIGS. 1(*a*)-(*c*) show scanning electron micrographs of melt fracture surfaces of various loadings of date pit particulate in high density polyethylene matrices.

The invention relates to composites of polymers filled with naturally occurring fillers. More specifically, it has been found that the fruit of dates, i.e. the date pits, can be ground into particulate and blended with polymers to form composites having unique surface characteristics upon melt processing of the composites, without sacrificing the overall strength characteristics of the polymers, as compared to the corresponding non-composited polymers.

Advantageously, the processes and products of the present invention provide inexpensive, renewable sources for polymer fillers which can act to reduce the overall cost of polymeric articles made from the composites, but also provide an avenue for reducing waste from the consumption of dates, commonly an every-day occurrence in many Middle Eastern households.

In implementing the present invention a mixture of date pit particulate can be blended with a thermoplastic polymer, the mixture melted, in for example a melt extruder as is known in the art, and the melt is forced through an extrusion die to produce a polymer composite having a fibril containing surface. Upon examination of the surface using scanning electron microscopy (SEM), it is found that the surface of the melt processed composites demonstrate a unique, fibril-containing melt fracture surface, which can enhance physical characteristics of the extruded polymer compositions, such as toughness and stiffness, as compared to neat polymers.

In embodiments, the date pit particulate can be particulate from the fruit of *Phoenix dactylifera* L., variety khlaas or sekari, which varieties are commonly consumed in large quantities in Middle Eastern households, such as in Saudi Arabia. The date pits are advantageously ground or chopped to particulate of an average size of between about 0.25 mm and 1.0 mm.

The melt processing according to the present invention can be practiced with a number of different thermoplastic polymers to form the composite matrix, such as those selected from the group consisting of polystyrene, polyethylene, polypropylene, polyethylene terephthalate, polyvinyl chloride, polymethylmethacrylate, polycarbonate, acrylonitrile-butadiene-styrene (ABS) and polyamide. Those skilled in the art will recognize that many other such thermoplastic polymers can be melt processed into date pit particulate/polymer composites and articles, such as molded articles, according to the present invention.

The concentration or loading of the date pit particulate in the composite is not particularly limited, and can advantageously be in an amount of between about 1 and about 40 wt % based on the weight of the composite. For example when the polymer is high density polyethylene, the composite can contain from 5 wt % to 30 wt % of date pit particulate from the variety sekari; or from 10 wt % to 40 wt % of date pit particulate from the variety khlaas. When the polymer is polystyrene, the composite can contain from 10 wt % to 40 wt % of date pit particulate from the variety khlaas, or from 5 wt % to 30 wt % of date pit particulate from the variety sekari.

In any event, the polymer composite demonstrates Tensile Strength varying no more than about 10% from that of the uncomposited polymer. Unexpectedly, date pit particulate/polymer composites can be successfully produced from thermosetting polymers too, such as from the group consisting of epoxies, vinyl esters and polyesters.

In this embodiment, a reinforced polymer composite is formed by solution blending a mixture of date pit particulate from the fruit of *Phoenix dactylifera* L., variety khlaas or sekari, and a solution of a thermosetting polymer, and removing solvent from the solution. Particulate loadings can advantageously be from about 5 wt % to about 40 wt %, depending on the date pit particulate/polymer combination.

EXAMPLES

Example 1

High Density Polyethylene (HDPE)/sekari (S) Composites

Figure 1B:
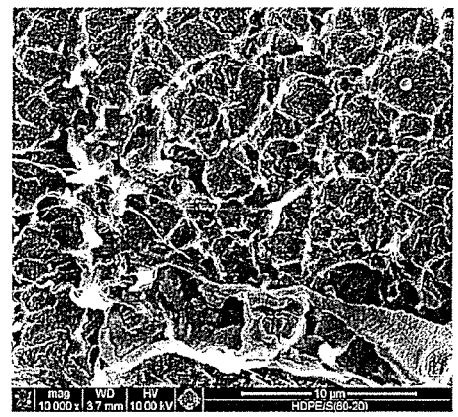
Figure 1C:
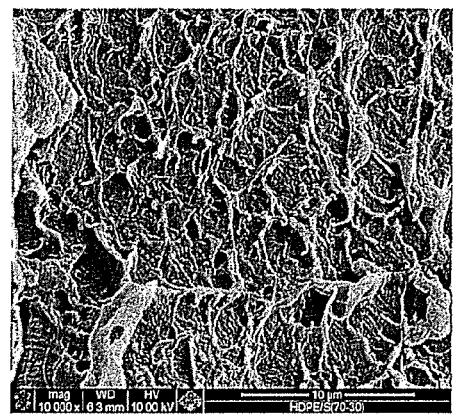
Figure 4:
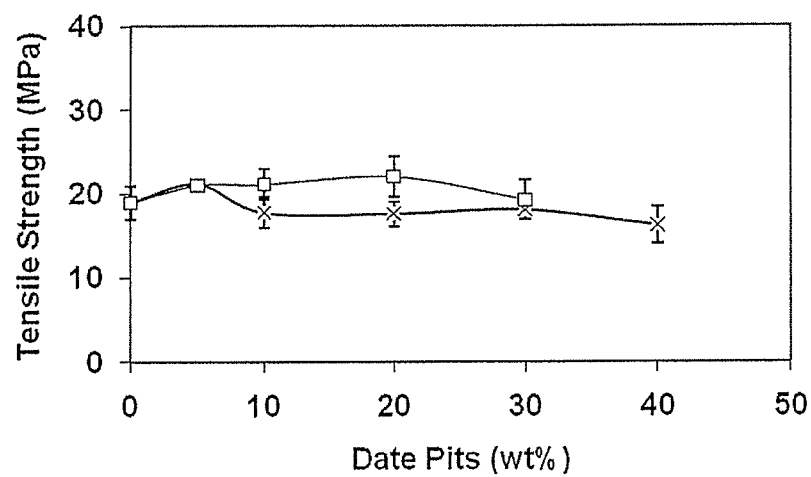
FIG. 4 shows a graph comparing the Tensile Strengths of various date pit particulate/high density polyethylene composites at various particulate loading levels.

Composites were formulated by melt extrusion where 10 to 40 wt % of date pit particulate was dispersed in a polymer matrix (HDPE). FIG. 1 shows the morphology of the fractured surface of the blends. It is clearly seen that some fibril morphology has developed. As far the mechanical properties, compounding polymer with date pits particulate did not affect important properties such as tensile strength (ASTM D-638), even at relatively high filler content, e.g 40 wt % (FIG. 4).

Example 2

Polystyrene (PS)/Date Pit Composites

Figure 2:
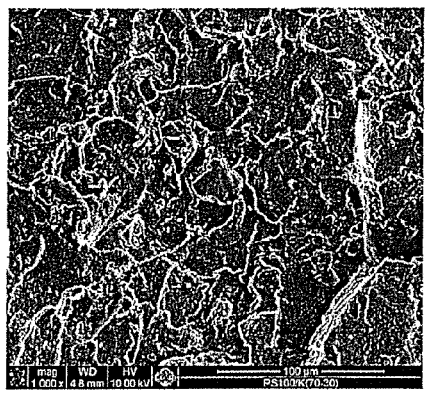
FIGS. 2(*a*) and (*b*) show scanning electron micrographs of melt fracture surfaces of various loadings of date pit particulate in polystyrene matrices.
Figure 2:
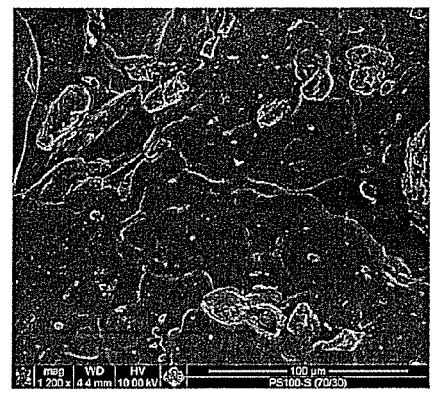

Samples of PS/date pit particulate composites were prepared and the morphology of the blends' melt fracture surfaces was studied by scanning electron microscope (SEM). FIG. 2 shows the morphology of PS/date pit particulates at 30 wt % particulate loading. The morphology exhibited some fibril-like characteristics, and satisfactory adhesion between date pit particulates and polymer matrix.

Example 3

Coupling Agent Composites

Figure 3:
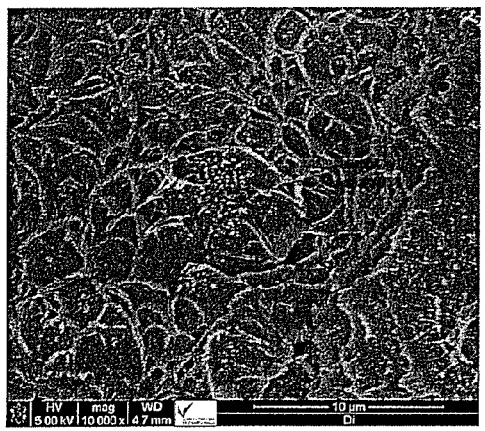
FIGS. 3(*a*) and (*b*) show scanning electron micrographs of melt fracture surfaces of composites of polystyrene, date pit particulates and two different compounding modifiers.
Figure 3:
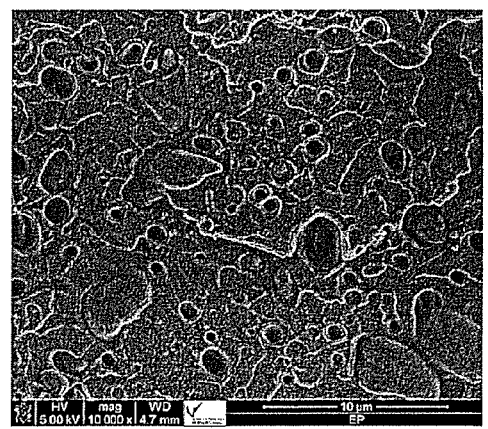

Coupling agents and compatibilizers such as isocynate, silane, and di-phenylmethane were compounded with the polymer/date pit particulate composites to enhance the surface morphology. FIG. 3(a) shows effect of adding di-phenylmethane (DPHM) to the melt fracture surface morphology of the composite containing 30 wt % K and 70 wt % PS.

Example 4

Toughness Modifier Composites

Toughness modifiers were added to the composites to compensate for the reduction in some properties, such as impact strength using some melated polyolefins elastomers (e.g. ethyelene/propylene grafted with maleic anhydride, indicated as EP-g-MA). FIG. 3(b) shows the morphology of melt fracture surface of a composite containing 30 wt % K and 70 wt % PS.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A composition comprising a mixture of date pit particulate from the fruit of *Phoenix dactylifera* L., variety khlaas or sekari, and a thermosetting polymer selected from the group consisting of epoxies, vinyl esters and polyesters, wherein the date pit particulate has an average size of between about 0.25 mm and 1.0 mm.

2. The composition of claim 1, wherein the date pit particulate is present in an amount of between about 1 and about 40 wt % based on the total weight of the composition.

3. The composition of claim 1, wherein the composition demonstrates tensile strength varying no more than about 10% from that of the uncomposited polymer.

4. The composition of claim 1, further comprising from 5 wt % to 30 wt % of date pit particulate from the fruit of *Phoenix dactylifera* L., variety sekari based on the total weight of the composition.

5. The composition of claim 4, wherein the composition demonstrates tensile strength varying no more than about 10% from that of the uncomposited polymer.

6. The composition of claim 1, further comprising from 10 wt % to 40 wt % of date pit particulate from the fruit of *Phoenix dactylifera* L., variety khlaas based on the total weight of the composition.

7. The composition of claim 6, wherein the composition demonstrates tensile strength varying no more than about 10% from that of the uncomposited polymer.

\* \* \* \* \*